(12) United States Patent
Lee et al.

(10) Patent No.: US 8,582,512 B2
(45) Date of Patent: Nov. 12, 2013

(54) METHOD OF TRANSMITTING AND RECEIVING DOWNLINK DATA IN WIRELESS COMMUNICATION SYSTEM

(75) Inventors: Young Dae Lee, Anyang-si (KR); Sung Duck Chun, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 624 days.

(21) Appl. No.: 12/312,152

(22) PCT Filed: Nov. 1, 2007

(86) PCT No.: PCT/KR2007/005497
§ 371 (c)(1),
(2), (4) Date: Apr. 28, 2009

(87) PCT Pub. No.: WO2008/054158
PCT Pub. Date: May 8, 2008

(65) Prior Publication Data
US 2010/0067454 A1 Mar. 18, 2010

Related U.S. Application Data

(60) Provisional application No. 60/863,957, filed on Nov. 1, 2006, provisional application No. 60/864,132, filed on Nov. 2, 2006.

(30) Foreign Application Priority Data

Nov. 1, 2007 (KR) .................. 10-2007-0110821

(51) Int. Cl.
*H04W 28/04* (2009.01)

(52) U.S. Cl.
CPC .................. *H04W 28/04* (2013.01)

USPC .......................................... 370/329

(58) Field of Classification Search
USPC .......................... 370/252, 329, 331
See application file for complete search history.

(56) References Cited

U.S. PATENT DOCUMENTS

| | | |
|---|---|---|
| 7,089,029 B2 | 8/2006 | Cao et al. |
| 2002/0019241 A1 | 2/2002 | Vialen et al. |
| 2002/0094833 A1 | 7/2002 | Lieshout et al. |
| 2002/0115460 A1 | 8/2002 | Rune et al. |
| 2004/0106430 A1 | 6/2004 | Schwarz et al. |
| 2004/0152473 A1 | 8/2004 | Kuwano et al. |
| 2004/0224688 A1* | 11/2004 | Fischer ............ 455/435.1 |
| 2005/0009527 A1* | 1/2005 | Sharma ............ 455/445 |

(Continued)

FOREIGN PATENT DOCUMENTS

| | | |
|---|---|---|
| CN | 1493118 | 4/2004 |
| EP | 1 071 304 | 1/2001 |

(Continued)

*Primary Examiner* — Mark Rinhart
*Assistant Examiner* — Matthew Hopkins
(74) *Attorney, Agent, or Firm* — McKenna Long & Aldridge LLP

(57) ABSTRACT

A method of transmitting data through a downlink common transport channel in a wireless communication system is disclosed. The method comprises receiving measurement information transmitted from a user equipment at an upper network node, forwarding control information of the common transport channel, which is acquired from the measurement information, from the upper network node to a base station, and transmitting downlink data from the base station to the user equipment through the common transport channel in accordance with the control information.

12 Claims, 4 Drawing Sheets

(56) References Cited

U.S. PATENT DOCUMENTS

| | | |
|---|---|---|
| 2005/0020260 A1 | 1/2005 | Jeong et al. |
| 2005/0153714 A1 | 7/2005 | Subrahmanya |
| 2005/0163074 A1* | 7/2005 | Mella et al. ............ 370/329 |
| 2005/0201319 A1 | 9/2005 | Lee et al. |
| 2005/0266846 A1* | 12/2005 | Kim ...................... 455/436 |
| 2006/0088058 A1* | 4/2006 | Eckert et al. ............ 370/469 |
| 2006/0094478 A1 | 5/2006 | Kim et al. |
| 2006/0098599 A1* | 5/2006 | Choi et al. ............ 370/331 |
| 2006/0221910 A1 | 10/2006 | Narasimha et al. |
| 2008/0069088 A1* | 3/2008 | Petrovic et al. .......... 370/354 |
| 2008/0089285 A1 | 4/2008 | Pirskanen et al. |
| 2008/0274754 A1 | 11/2008 | Kuo |
| 2009/0318170 A1 | 12/2009 | Lee et al. |

FOREIGN PATENT DOCUMENTS

| | | |
|---|---|---|
| EP | 1 221 821 | 7/2002 |
| EP | 1 223 775 | 7/2002 |
| GB | 2 371 179 | 7/2002 |
| GB | 2 409 603 | 6/2005 |
| JP | 2002-501706 | 1/2002 |
| JP | 2002-232353 | 8/2002 |
| JP | 2003-309869 A | 10/2003 |
| JP | 2005-512474 | 4/2005 |
| JP | 2005-525057 A | 8/2005 |
| JP | 2006-229382 A | 8/2006 |
| JP | 2008-518548 | 5/2008 |
| KR | 10-2001-0110537 | 12/2001 |
| KR | 10-2002-0027247 | 4/2002 |
| KR | 10-2002-0039121 | 5/2002 |
| KR | 10-2003-0029310 | 4/2003 |
| KR | 10-2005-0028254 | 3/2005 |
| WO | WO 02/056498 | 7/2002 |
| WO | WO 2005/079085 | 8/2005 |
| WO | WO 2006/034819 | 4/2006 |
| WO | WO 2006/049441 | 5/2006 |
| WO | WO 2007/148932 | 12/2007 |

\* cited by examiner

METHOD OF TRANSMITTING AND RECEIVING DOWNLINK DATA IN WIRELESS COMMUNICATION SYSTEM

This application is a 35 U.S.C. §371 National Stage entry of International Application No. PCT/KR2007/005497, filed on Nov. 1, 2007, and claims the benefit of Korean Application No. 10-2007-00110821, filed on Nov. 1, 2007; U.S. Provisional Application No. 60/863,957, filed Nov. 1, 2006; and U.S. Provisional Application No. 60/864,132, filed Nov. 2, 2006, all of which are hereby incorporated by reference in their entireties.

TECHNICAL FIELD

The present invention relates to a wireless communication system, and more particularly, to a method of transmitting and receiving downlink data to and from a user equipment through a downlink common transmission channel of a wireless communication system.

BACKGROUND ART

In a universal mobile telecommunication system (UMTS) which is an asynchronous mobile communication system, a transport channel provides a path for data transmission between a physical layer and a medium access control (MAC) layer. Unlike a logical channel, various kinds of transport channels can be used in accordance with occurrence characteristics of data which are transmitted. The transport channel can be divided into two types of a dedicated channel and a common channel. The dedicated channel means a channel used dedicatedly by a specific user equipment. The common transport channel is a channel that can be used commonly by a plurality of user equipments, and its examples include a random access channel (RACH), a forward access channel (FACH), a broadcast channel (BCH), a paging channel (PCH), a high speed downlink shared channel (HS-DSCH), a common packet channel (CPCH), and an uplink shared channel (USCH).

Among the aforementioned common transport channels, examples of channels used for downlink data transmission include FACH and HS-DSCH. Generally, the FACH is a downlink common channel used when a small number of data are transmitted to a user equipment. The HS-DSCH is a downlink common transport channel used for high speed data transmission in a high speed downlink packet access (HS-DPA) system. On the HS-DSCH, a plurality of user equipments share radio resources by using a plurality of common channelization codes. Each of the user equipments can be allocated with a plurality of channelization codes within a single transmission time interval (TTS) in accordance with its capacity, and data for the plurality of user equipments can be transmitted by code multiplexing within a single HS-DSCH TTI.

The FACH can be mapped with a secondary common control physical channel (S-CCPCH) which is a physical channel, and then can downwardly transmit data dedicated for user equipment or common data. The S-CCPCH includes a transport format combination indicator (TFCI) field, a data field, and a pilot field. The TFCI field notifies a transport format of data transmitted to the data field. At this time, a radio network controller (RNC) of a network is in charge of scheduling of the FACH, and Node B serves to transmit FACH data in a wireless manner through the S-CCPCH in accordance with scheduling of RNC.

DISCLOSURE OF THE INVENTION

In the related art as described above, downlink data transmission through the FACH which is one of downlink common transport channels has a problem in that it is scheduled by a controller of a wireless network and is not adapted to fast change in a state of a wireless channel. Also, a problem occurs in that downlink data transmission is not suitable for high speed transmission due to a limited data transmission rate.

Accordingly, the present invention is directed to a method of transmitting and receiving downlink data in a wireless communication system, in which data transmission can be adapted to status change of a wireless channel.

To achieve these objects and other advantages and in accordance with the purpose of the invention, as embodied and broadly described herein, a method of transmitting data through a downlink common transport channel in a wireless communication system is disclosed. In one embodiment of the present invention, an upper network node receives measurement information transmitted from a user equipment The network node delivers, to a base station, control information associated with the common transport channel, which is acquired from the measurement information and the base station transmits downlink data from the base station to the user equipment through the common transport channel in accordance with the control information.

In a method of transmitting data through a downlink common transport channel in a wireless communication system in accordance with another aspect of the present invention, an upper network node receives measurement information transmitted from a user equipment The network node delivers at least a part of the measurement information to a base station, and the base station transmits downlink data to the user equipment through the common transport channel by using the measurement information received from the network node. When transmitting the downlink data, the base station determines a transmission power of a physical channel mapped to the common transport channel, by using the measurement information received from the upper network node, and transmits the downlink data to the user equipment through the physical channel at the determined transmission power.

In still another aspect of the present invention, a method of transmitting data through a downlink common transport channel in a wireless communication system comprises receiving measurement information transmitted from a user equipment in an upper network node, forwarding control information related to the common transport channel, which is acquired from the measurement information, from the upper network node to a base station, and scheduling downlink data transmission to the user equipment through the common transport channel in the base station by using the control information.

In further still another aspect of the present invention, a method of receiving data through a downlink common transport channel in a wireless communication system comprises transmitting measurement information to an upper network node, and receiving downlink data from a base station through a physical channel mapped with the downlink common transport channel, wherein a transmission power of the physical channel is acquired from the measurement information by the upper network node and determined in accordance with transmission power control information forwarded to the base station.

BEST MODE FOR CARRYING OUT THE INVENTION

Hereinafter, structures, operations, and other features of the present invention will be understood readily by the preferred embodiments of the present invention, examples of which are illustrated in the accompanying drawings. Embodiments described hereinafter are examples in which technical features of the present invention are applied to a Universal Mobile Telecommunications System (UMTS). Release 7 of "3GPP technical specifications" ($3^{rd}$ Generation Partnership Project; Technical Specification Group Radio Access Network) can be referred to obtain detailed information of technical specification about the UMTS.

Figure 1:
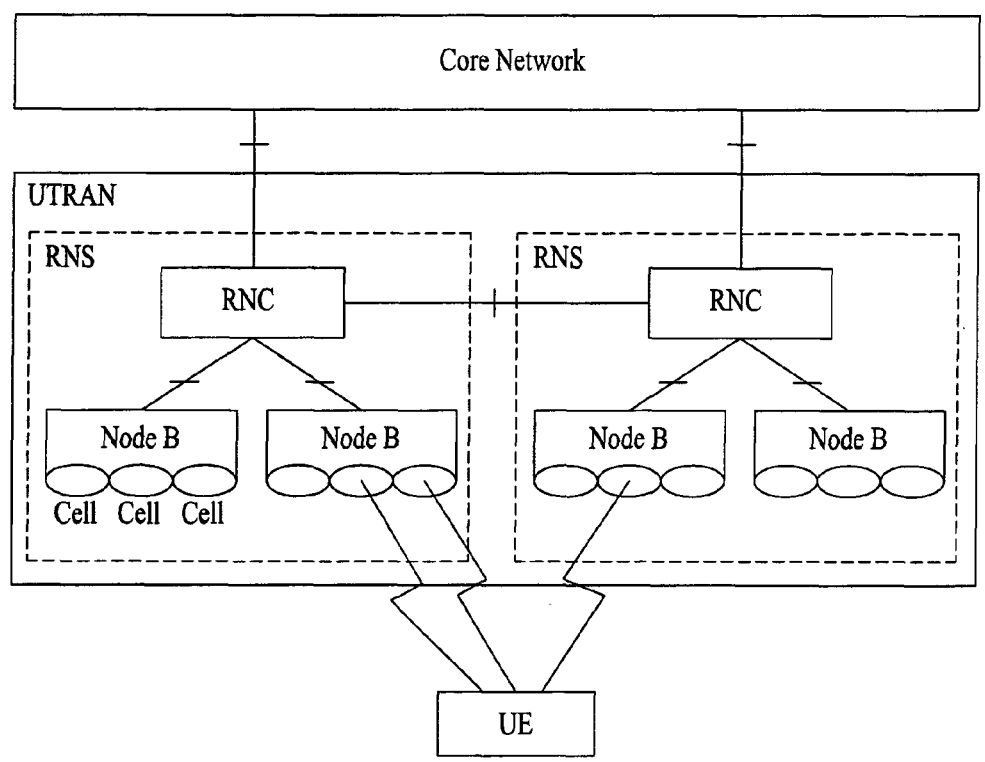
FIG. 1 is a diagram illustrating a network architecture of a UMTS (Universal Mobile Telecommunications System).

FIG. 1 illustrates a network architecture of UMTS. Referring to FIG. 1, the UMTS includes a user equipment (UE), UMTS terrestrial radio access network (UTRAN), and a core network (CN). The UTRAN includes one or more radio network sub-systems (RNS), wherein each of the RNS includes a radio network controller (RNC) and one or more base stations (Node B) managed by the RNC. One or more cells exist in one Node B.

Figure 2:
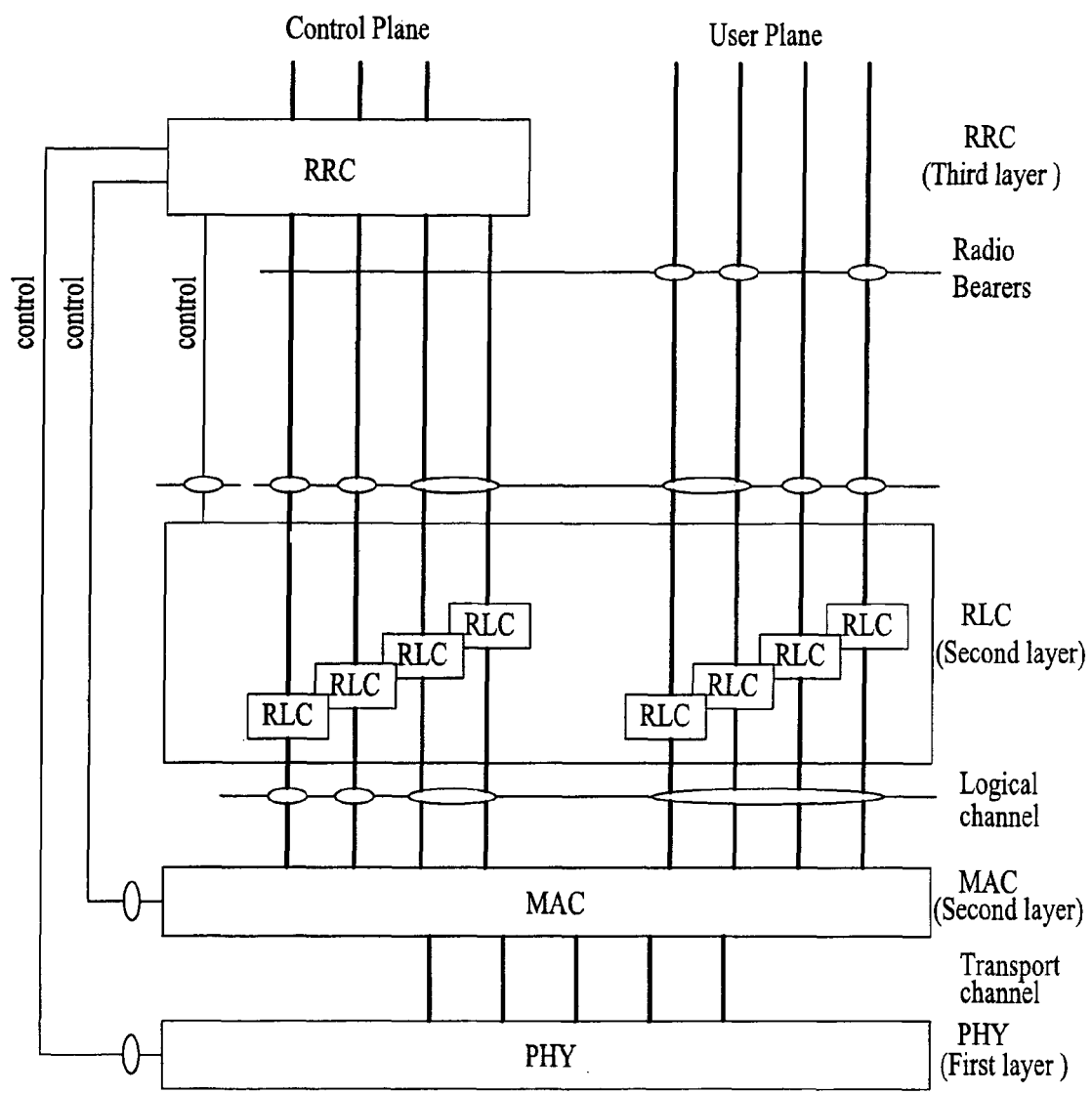
FIG. 2 is a diagram illustrating a radio protocol architecture which is used in UMTS.

FIG. 2 illustrates a radio protocol architecture which is used in the UMTS. Radio protocol layers shown in FIG. 2 exist in the UTRAN in pairs with user equipments and are in charge of data transmission in a radio interval. Each of the radio protocol layers will be described below. First of all, a physical (PHY) layer belonging to a first layer serves to transmit data to a radio interval by using various radio transmission techniques. The PHY layer is connected with a medium access control (MAC) layer, which is an upper layer of the PHY layer, through a transport channel. The transport channel is divided into a dedicated transport channel and a common transport channel depending on whether to share channels.

A medium access control (MAC) layer, a radio link control (RLC) layer, a packet data convergence protocol (PDCP) layer, and a broadcast/multicast control (BMC) layer exist in a second layer. The MAC layer serves to map various logical channels with various transport channels and to multiplex several logical channels with one transport channel. The MAC layer is connected with the RLC layer, which is an upper layer of the MAC layer, through a logical channel. The logical channel is divided into a control channel and a traffic channel depending on kinds of information which is transmitted, wherein the control channel transmits information of a control plane and the traffic channel transmits information of a user plane.

The MAC layer is subdivided into a MAC-b sublayer, a MAC-d sublayer, a MAC-c/sh sublayer, a MAC-hs sublayer, and a MAC-e sublayer depending on kinds of a transport channel. The MAC-b sublayer manages a broadcast channel (BCH), the MAC-c/sh sublayer manages a common transport channel such as a forward access channel (FACH) or a downlink shared channel (DSCH), and the MAC-d sublayer manages a dedicated channel. The broadcast channel (BCH) is a transport channel which is in charge of broadcasting of system information, the common transport channel is shared with other user equipments, and the dedicated channel is a transport channel for only a specific user equipment. Also, to support downlink and uplink data transmission of high speed, the MAC-hs sublayer manages a high speed downlink shared channel (HS-DSCH) which is a transport channel for downlink data transmission of high speed while the MAC-e sublayer manages an enhanced dedicated channel (E-DCH) which is a transport channel for uplink data transmission of high speed.

The RLC layer serves to assure quality of service (QoS) of each radio bearer (RB) and transmit data. The RLC layer includes one or two independent RLC entities for each RB to assure unique QoS of the RB, and provides three RLC modes, i.e., a transparent mode (TM), an unacknowledged mode (UM), and an acknowledged mode (AM) to support various kinds of QoS. Furthermore, the RLC layer serves to control data size to allow its lower layer to transmit data to a radio interval. To this end, the RLC layer serves to generate a protocol data unit (PDU) by segmenting and connecting service data unit (SDU) data received from its upper layer and to forward the generated protocol data unit to its lower layer.

The PDCP layer is located above the RLC layer, and allows data transmitted using IP packet such as IPv4 or IPv6 to be efficiently transmitted in a radio interval having a relatively small bandwidth. To this end, the PDCP layer performs a header compression function, which allows information necessarily required for a header part of data to be transmitted, thereby increasing transmission efficiency of the radio interval. The PDCP layer exists only in a packet service (PS) domain due to its basic function, i.e., a header compression function, and has one PDCP entity per RB to provide effective header compression function for each packet service (PS).

In addition, the second layer includes a broadcast/multicast control (BMC) layer which exists above the RLC layer, wherein the BMC layer serves to perform scheduling of a cell broadcast message and broadcast for user equipments located in a specific cell.

A radio resource control (RRC) layer located at the lowest part of a third layer is defined only in a control plane, and is related to establishment, re-establishment, and release of RBs to control parameters of the first and second layers. Also, the RRC layer serves to control logical channels, transport channels and physical channels. At this time, the RB means a logical path provided by the first and second layers of the radio protocol for data transmission between the user equipment and the UTRAN. In general, establishment of the RB means that characteristics of channels and radio protocol layers required to provide a specific service are defined, and respective detailed parameters and operation method are established.

Figure 3:
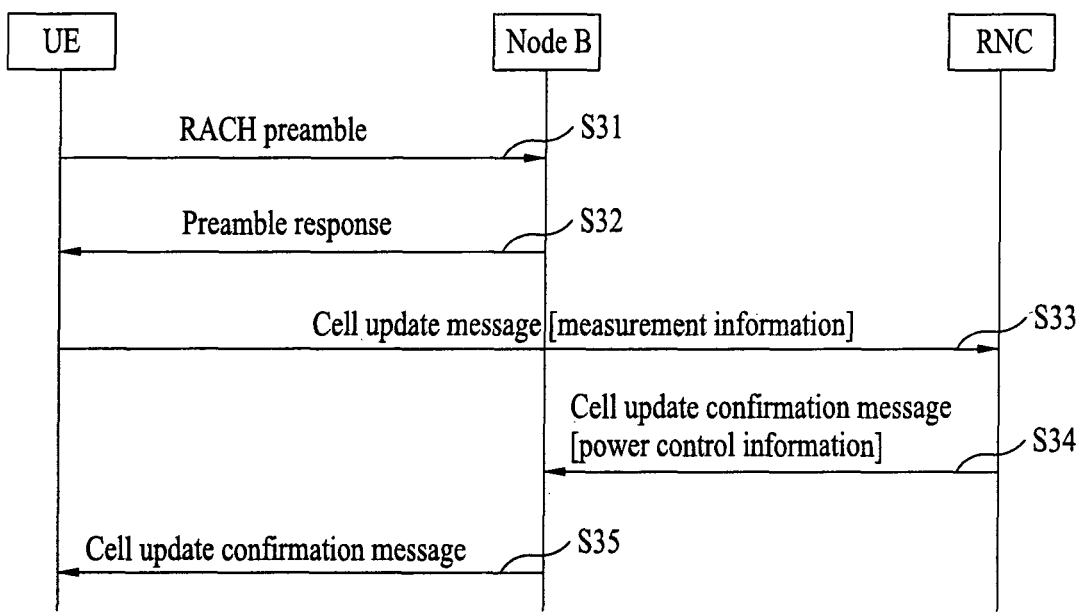
FIG. 3 is a flow chart illustrating a procedure according to one embodiment of the present invention.
Figure 4:
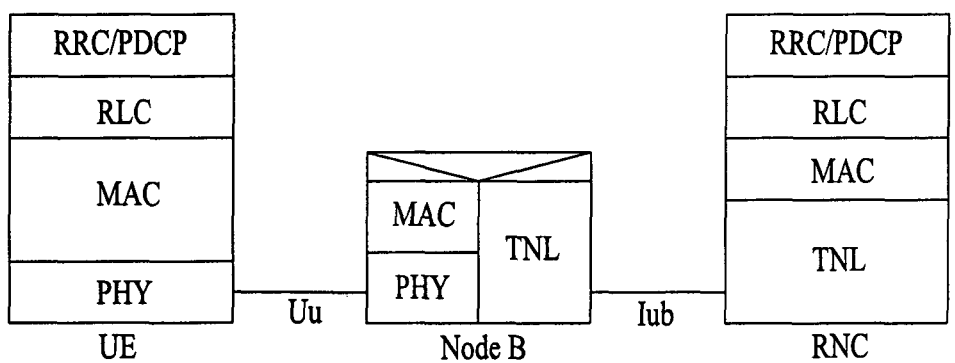
FIG. 4 is a diagram illustrating a protocol architecture in case where downlink data are transmitted to a user equipment through a forward access channel (FACH) in accordance with the embodiment of FIG. 3.

FIG. 3 is a flow chart illustrating a procedure according to one embodiment of the present invention. In the embodiment of FIG. 3, a network transmits downlink data to a user equipment through a forward access channel (FACH) which is a downlink common transport channel. FIG. 4 is a diagram illustrating a protocol architecture in case where downlink data are transmitted to the user equipment through the FACH in accordance with the embodiment of FIG. 3. Scheduling for downlink data transmission through the FACH is performed in the MAC layer of Node B. It will be apparent that the features of the present invention can be applied to downlink data transmission through another downlink common transport channel such as a high speed downlink shared channel (HS-DSCH) in addition to the FACH.

Referring to FIG. 3, the user equipment transmits a random access channel (RACH) preamble to Node B through a random access channel (RACH) to initiate a random access procedure. The RACH is used to upwardly transmit data of a short length, and some RRC messages such as RRC connection request message, cell update message, and URA update message are transmitted through the RACH. Logical channels such as common control channel (CCCH), a dedicated control channel (DCCH), and a dedicated traffic channel (DTCH) can be mapped to the transport channel, i.e., RACH. The transport channel, RACH is again mapped to a physical channel, i.e., physical random access channel (PRACH).

If the MAC layer of the user equipment commands the physical (PHY) layer to perform PRACH transmission, the physical layer of the user equipment selects one access slot and one signature and transmits PRACH preamble to the Node B [S31]. The preamble is transmitted for an access slot interval of 1.33 ms, and one of 16 signatures is selected and transmitted for a first certain length of the access slot. If the user equipment transmits a preamble, the Node B transmits a preamble response message through an acquisition indicator channel (AICH) which is a downlink physical channel. In other words, the Node B transmits the signature selected by the preamble for the first certain length of the access slot corresponding to the access slot to which the preamble is transmitted, through the AICH in response to the preamble. At this time, the Node B transmits acknowledgement (ACK) or non-acknowledgement (NACK) to the user equipment through the signature transmitted through the AICH.

If the user equipment receives ACK from the Node B through the preamble response message, the user equipment transmits a message part of 10 ms or 20 ms to the Node B by using an orthogonal variable spreading factor (OVSF) code corresponding to the transmitted signature [S33]. If the user equipment receives NACK, the MAC layer of the user equipment commands the physical layer to transmit the RACH preamble again after a certain time period. Meanwhile, if the user equipment has not received the AICH corresponding to the transmitted preamble, the user equipment transmits a new preamble at a power higher than that of the previous preamble by one level after a given access slot.

As described above, if the user equipment receives the preamble response message which includes ACK, from the Node B, the user equipment transmits a message of short length through RACH message part. The RACH message part may include several RRC messages such as RRC connection request message, cell update message, and URA update message. FIG. 3 illustrates an example of transmitting a cell update message through the RACH message part. A cell update procedure is used so that the user equipment which is in Cell_FACH or Cell-PCH state can notify the UTRAN of its location information at a cell level. The user equipment transmits the cell update message to update its location information. Since the cell update message is RRC message, it is forwarded to RNC where the RRC layer is located in the UTRAN.

The cell update message includes a start value related to data safety and a cell update cause. Examples of the cell update cause that the user equipment can transmit the cell update message include the case where that the user equipment has data to be transmitted to an uplink in URA_PCH or Cell_PCH state, the case where the user equipment needs to respond to a paging message received from the UTRAN, and the case where a radio link failure occurs when the user equipment is in Cell_DCH state.

In the embodiment of FIG. 3, the cell update message further includes measurement information. A measurement procedure means that the user equipment measures traffic volume, channel quality, its location, etc. to provide the RNC with various kinds of information required network management and resource allocation considering a wireless environment. The UTRAN broadcasts measurement related control information through system information or transmits the measurement related control information to the user equipment through a measurement control message, wherein the measurement related control information is required to allow the user equipment to perform the measurement procedure and report a result of the measurement procedure. If a standard set to report the result of the measurement procedure to the UTRAN in accordance with the measurement related control information is satisfied, the user equipment transmits measurement information to the RNC of the UTRAN periodically or when a specific event occurs. The measurement related control information is described in detail in the technical standard of UMTS.

Preferably, the measurement information includes information required to allow the UTRAN to control transmission of downlink data through FACH which is a downlink common transport channel. For example, the measurement information may include quality information of FACH, receiving strength of a signal received in the user equipment through FACH, quality information of a common pilot channel (CPICH) which is a reference channel, information related to receiving strength of a signal received through the CPICH, etc. Furthermore, the measurement information may include control information of transmission power and/or data rate of FACH or HS-DSCH, which is determined by the user equipment.

After receiving the cell update message from the user equipment and updating location information of the user equipment, the RNC transmits a cell update confirmation Message to the user equipment through the Node B [S34, S35]. The RNC forwards the cell update confirmation message to the Node B through Iub interface and also forwards power control information for controlling a transmission power of the FACH or data rate control information of data transmitted through the FACH to the Node B. The power control information or the data rate control information could be either a value determined by the user equipment and transmitted to the RNC, or a value determined by the RNC from the measurement information transmitted from the user equipment. The Node B transmits the cell update confirmation message to the user equipment through the FACH at a data rate or transmission power controlled in accordance with the power control information. Since the FACH is mapped to a secondary common control physical channel (S-CCPCH) which is a physical channel, controlling the transmission power or data rate of the FACH means controlling the transmission power or data rate of the S-CCPCH.

If downlink data are transmitted to the user equipment through the FACH, the S-CCPCH mapped to the FACH is transmitted using a plurality of OVSF codes. At this time, TFCI codeword of a TFCI field of the S-CCPCH can notify the user equipment of the number of OVSF codes along with a transport format. The relation among the TFCI codeword, a specific transport format, and a specific number of OVSF codes can be transmitted to the user equipment through RRC message such as radio bearer setup message or system information. The user equipment determines S-CCPCH to be received thereto through the RACH message or its identifier. If the user equipment can receive the S-CCPCH transmitted by a plurality of OVSF codes, the user equipment can identify a transport format and OVSF codes indicated by specific TFCI codeword, through the RRC message. The user equipment acquires the TFCI codeword of the TFCI field of the S-CCPCH, and decodes data of the S-CCPCH, which is transmitted to the same frame as that of the acquired codeword, in accordance with the acquired codeword.

If the user equipment cannot receive the S-CCPCH transmitted by a plurality of OVSF codes, the user equipment determines TFCI codeword, which indicate the number of OVSF codes, as an ineffective codeword, and does not decode data of the S-CCPCH transmitted to the same frame as that of the TFCI codeword.

For example, as for number 1 to number 20 of the TFCI codeword, a transport format is only reported, and as for number 21 to number 40 of the TFCI codeword, the number of OVSF codes is reported along with a transport format. At this time, the user equipment which cannot receive the S-CCPCH transmitted by a plurality of OVSF codes determines the TFCI codeword corresponding to number 1 to number 20 as effective codeword and determines the other TFCI codeword as ineffective codeword. Meanwhile, the user equipment which can receive the S-CCPCH transmitted by a plurality of OVSF codes determines all the TFCI codeword corresponding to number 1 to number 40 as effective codeword and decodes data in accordance with the TFCI codeword.

Figure 5:
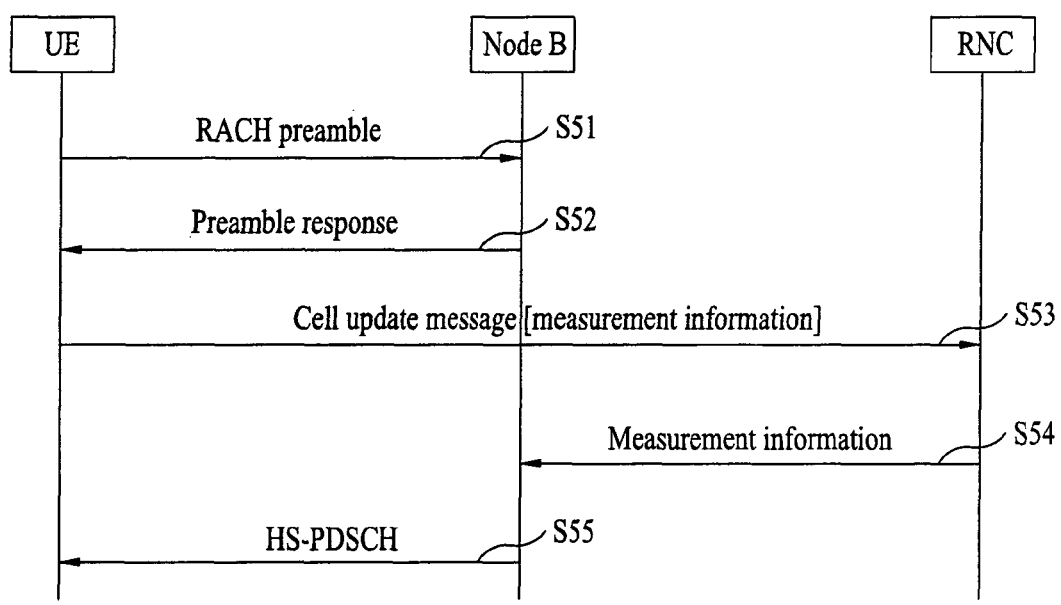
FIG. 5 is a flow chart illustrating a procedure according to another embodiment of the present invention.

FIG. 5 is a flow chart illustrating a procedure according to another embodiment of the present invention. The embodiment of FIG. 5 relates to an example of transmitting downlink data from the network to the user equipment through the HS-DSCH which is a downlink common transport channel.

In FIG. 5, the procedure from step S51 to step S53 can refer to that described in the embodiment of FIG. 3. The RNC forwards at least a part of measurement information received from the user equipment (UE) or HS-DSCH control information acquired from the measurement information to the Node B [S54]. The measurement information or HS-DSCH control information can be forwarded to the Node B by being included in a header part of a data block forwarded from the RNC to the Node B. The Node B determines a transmission power or data rate of HS-PDSCH which is a physical channel, by using the measurement information or HS-DSCH control information received from the RNC. The Node B transmits downlink data to the user equipment through the HS-PDSCH in accordance with the determined transmission power or data rate [S55].

According to the present invention, it is advantageous in that data transmission through the downlink common transport channel in the wireless communication system can be adapted to change of the channel status.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on data transmission and reception between the user equipment and the network. A specific operation which has been described herein as being performed by the network may be performed by the base station or an upper node of the base station as the case may be. In other words, it will be apparent that various operations performed for communication with the user equipment in the network which includes a plurality of network nodes along with the base station may be performed by the base station or network nodes other than the base station. The base station may be replaced with terms such as a fixed station, Node B, eNode B (eNB), and access point. Also, the user equipment may be replaced with terms such as mobile station and mobile subscriber station.

The embodiments according to the present invention may be implemented by various means, for example, hardware, firmware, software, or their combination. If the embodiment according to the present invention is implemented by hardware, the method of transmitting downlink data in the wireless communication system according to the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method of transmitting downlink data in the wireless communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Industrial Applicability

The present invention is applicable to a wireless communication system such as a mobile communication system, a wireless Internet system, and the like.

The invention claimed is:

1. A method of controlling transmission of downlink data through a downlink common transport channel at a base station in a wireless communication system, the method comprising:

receiving, by the base station, a random access preamble from a user equipment;

transmitting a response to the random access preamble from the base station to the user equipment;

receiving, by a radio network controller (RNC), a radio resource control (RRC) message on the random access channel from the user equipment, the RRC message comprising measurement information which includes a result of measurement performed by the user equipment;

transmitting the measurement information which includes the result of measurement from the RNC to the base station after receiving the RRC message from the user equipment; and determining, by the base station, at least one of a data rate and transmission power for transmission of downlink data to the user equipment on the downlink common transport channel based on the measurement information received from the RNC.

2. The method of claim 1 further comprising
transmitting the downlink data to the user equipment according to the determined data rate or transmission power on a physical channel to which the downlink common transport channel is mapped.

3. The method of claim 2, wherein the downlink common transport channel is a high speed downlink shared channel (HS-DSCH).

4. The method of claim 3, wherein the physical channel is a high speed physical downlink shared channel (HS-PDSCH).

5. The method of claim 1, wherein the upper layer message is a cell update message.

6. The method of claim 5, wherein the downlink data is a cell update confirmation message.

7. The method of claim 1, wherein the measurement information is included in a header part of a data block to be transmitted from the RNC to the base station.

8. A method of receiving data through a downlink common transport channel at a user equipment in a wireless communication system, the method comprising:

transmitting a random access preamble from the user equipment to a base station;

receiving, by the user equipment, a response to the random access preamble from the base station;

transmitting a radio resource control (RRC) message comprising measurement information on a random access channel from the user equipment to a radio network controller (RNC), wherein the measurement information includes a result of measurement performed by the user equipment; and receiving, by the user equipment, downlink data from the base station through a physical channel mapped to the downlink common transport channel, the downlink data transmitted from the base station at a data rate or transmission power determined by the base station based on the measurement information which has been transmitted from the RNC to the base station.

9. The method of claim 8, wherein the user equipment is in a Cell_FACH or Cell_PCH state.

10. The method of claim 8, wherein the downlink common transport channel is a high speed downlink shared channel (HS-DSCH).

11. The method of claim 10, wherein the physical channel is a high speed physical downlink share channel (HS-PDSCH).

12. The method of claim 8, wherein the downlink data is a cell update confirmation message.

* * * * *